INVENTOR.
GEORGE V. WOODLING
BY
Woodling, Krost, Granger and Rust
attys.

INVENTOR.
GEORGE V. WOODLING

Oct. 15, 1968  G. V. WOODLING  3,405,603
FLUID PRESSURE DEVICE AND VALVE SYSTEM THEREFOR
WITH IMPROVED VALVE DRIVE MECHANISM
Filed May 10, 1967  4 Sheets-Sheet 3
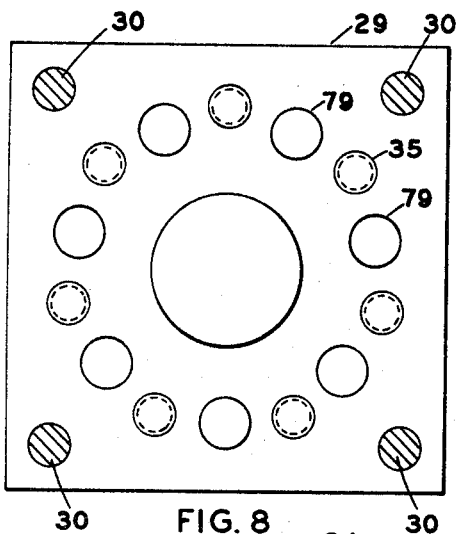
FIG. 8
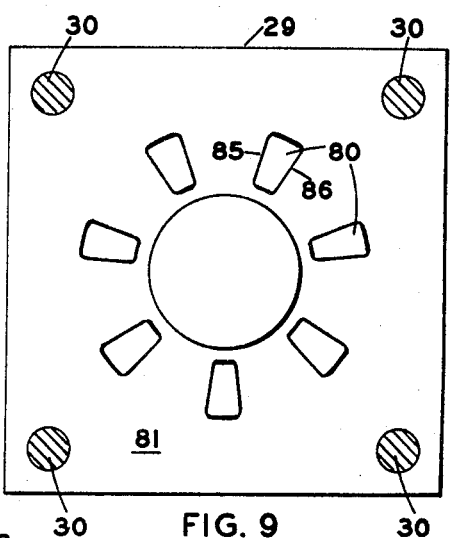
FIG. 9
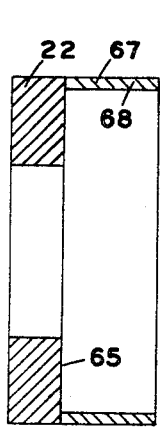
FIG. 10
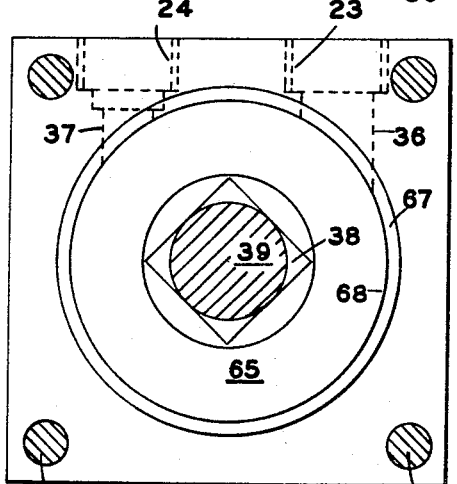
FIG. 11
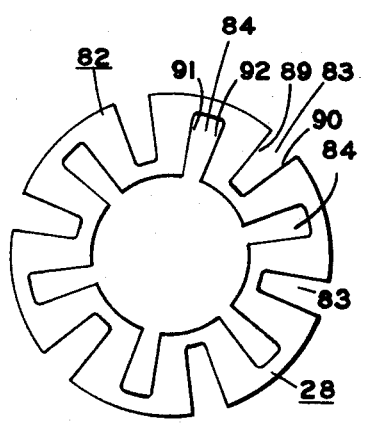
FIG. 12
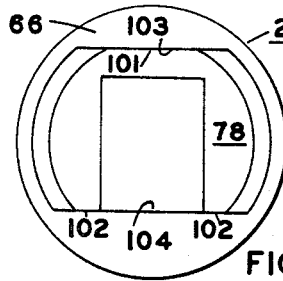
FIG. 14
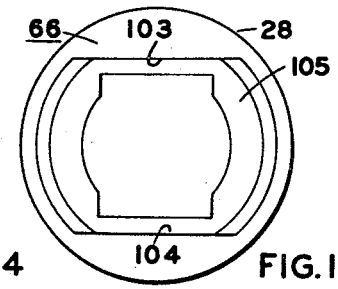
FIG. 17
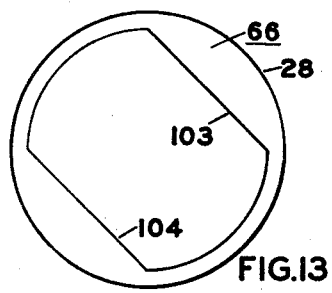
FIG. 13
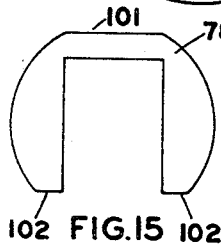
FIG. 15
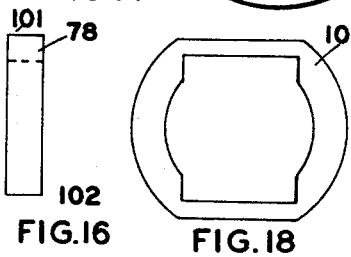
FIG. 18
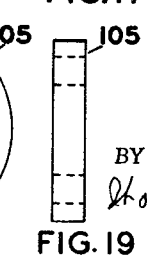
FIG. 19
FIG. 16
INVENTOR.
GEORGE V. WOODLING
BY
Woodling, Krost, Granger
and Rust
attys.

Oct. 15, 1968  G. V. WOODLING  3,405,603
FLUID PRESSURE DEVICE AND VALVE SYSTEM THEREFOR
WITH IMPROVED VALVE DRIVE MECHANISM
Filed May 10, 1967  4 Sheets-Sheet 4

INVENTOR.
GEORGE V. WOODLING
BY
Woodling, Krost, Granger and Rust
attys.

United States Patent Office 3,405,603
Patented Oct. 15, 1968

3,405,603
FLUID PRESSURE DEVICE AND VALVE SYSTEM THEREFOR WITH IMPROVED VALVE DRIVE MECHANISM
George V. Woodling, 22077 W. Lake Road, Rocky River, Ohio 44116
Continuation-in-part of applications Ser. No. 571,915, Aug. 11, 1966, and Ser. No. 603,508, Dec. 21, 1966.
This application May 10, 1967, Ser. No. 637,382
25 Claims. (Cl. 91—56)

ABSTRACT OF THE DISCLOSURE

A fluid pressure device having a stator element and a rotor element defining a stator-rotor mechanism with the rotor element operatively connected to a main shaft by a wobble shaft and including a rotary valve disposed to control the entrance of fluid to and the exit of fluid from the stator-rotor mechanism. The stator element has a fixed axis and the rotor element has a movable axis. The rotor element has a rotational movement about its own axis and an orbital movement about the fixed axis. The rotary valve has internal wall means defining an enlarged opening through which the wobble shaft extends. Universal torque-transmitting means is mounted between the rotary valve and the intermediate portion of the wobble shaft which extends through the enlarged opening thereof. The universal torque-transmitting means provides for rotating the valve once for each rotation of the rotor element. The main shaft is supported by tapered roller bearings in combination with means to accommodate for axial tolerances in fixing the position of the bearings in the bore of the housing.

My invention relates to a fluid pressure device and a valve system therefor with improved valve drive mechanism.

This application is a continuation-in-part of my applications, Ser. No. 571,915 filed Aug. 11, 1966 and Ser. No. 603,508 filed Dec. 21, 1966, both now abondoned.

The fluid pressure device may comprise a fluid motor, a fluid pump, a fluid transmission, a fluid servomotor and/or any other related device.

The fluid pressure device is of the type usually referred to in the trade as a stator-rotor orbital mechanism.

In this application, the term "stator" and "rotor" are not used in a limited sense. The term "stator" is applied to the element which has a fixed axis and the term "rotor" is applied to the element which has a movable axis characterized in that said rotor is disposed for rotational movement about its own movable axis and for orbital movement about said fixed axis of the stator. Thus, in this application, the outer surrounding element, usually referred to as the stator, may be either the stator or the rotor, depending upon whether it has a fixed axis or a movable axis and the inner element, usually referred to as the rotor, may be either the rotor or the stator depending upon whether it has a movable axis or a fixed axis.

The valve system of my invention constitutes an improvement over the prior art and involves a new separate valve means for commutatively directing the flow of fluid to and from the stator-rotor mechanism.

An object of my invention is to isolate the operation of the valve system from the fluid ports in the housing and to render it free from any distortion of the housing incident to screwing in the fittings.

Another object is the provision of a valve system which will seal high fluid pressures, resulting in higher efficiency.

Another object is the provision of a valve system which does not necessarily restrict the flow of fluid to and from the stator-rotor mechanism.

Another object is to provide an enlarged fluid-line reservoir at the valve entrance of the stator-rotor mechanism and an enlarged fluid-line reservoir at the valve exit of the stator-rotor mechanism.

Another object is the provision of a valve system having fluid commutating characteristics, and includes a stationary valve member and a rotary valve member disposed for rotational movement relative to the stationary valve member about the fixed axis.

Another object is to separate the rotary valve from the main shaft, whereby the rotary valve is free from both the radial thrust and the end thrust to which the main shaft is subjected.

Another object is to render the rotary valve action independent of the radial thrust and the end thrust of the main shaft.

Another object is the provision of universal drive means for the rotary valve having rotational phasing.

Another object is to provide for independently mounting the rotary valve between the main shaft and the stator-rotor mechanism.

Another object is the provision of a hydraulically balanced rotary valve, free from radial thrust and end thrust due to fluid pressure acting on the valve.

Another object is to mount the main shaft in tapered roller bearings, whereby the main shaft may withstand both a large radial thrust and a large end thrust.

Another object is to provide for accommodating axial tolerances in the mounting of the tapered roller bearings to achieve a fixed axial location for the bearings.

Another object is the provision of a main shaft which is capable of withstanding a heavy load.

The drive mechanism for driving the rotary valve of my valve system constitutes an improvement over the prior art and involves a new driving action.

Another object is to actuate the rotary valve by an intermediate portion of an actuating shaft interconnecting the rotor element and the main shaft.

Another object is to rotate the valve once for each rotation of the actuating shaft.

Another object is the provision of driving a rotary valve by an orbital and a rotational moving shaft portion disposed within a central opening of the rotary valve, between which there is mounted universal torque-transmitting means for rotating the valve once for each rotation of the shaft portion.

Other objects and a fuller understanding of the invention may be had by referring to the following description and claims, taken in conjunction with the accompanying drawings, in which:

FIGURE 8 is a view taken along the line 8—8 of FIGURE 3, showing the side of the stationary valve member, next adjacent to the stator-rotor mechanism;

FIGURE 9 is a view showing the opposite side of the stationary valve, next adjacent the rotary valve;

FIGURE 10 is a vertical cross-sectional view of a bushing which separates the hollow housing into a left-hand end compartment and a right-hand end compartment, including an abutment sleeve for securing the bushing in place;

Figure 1:
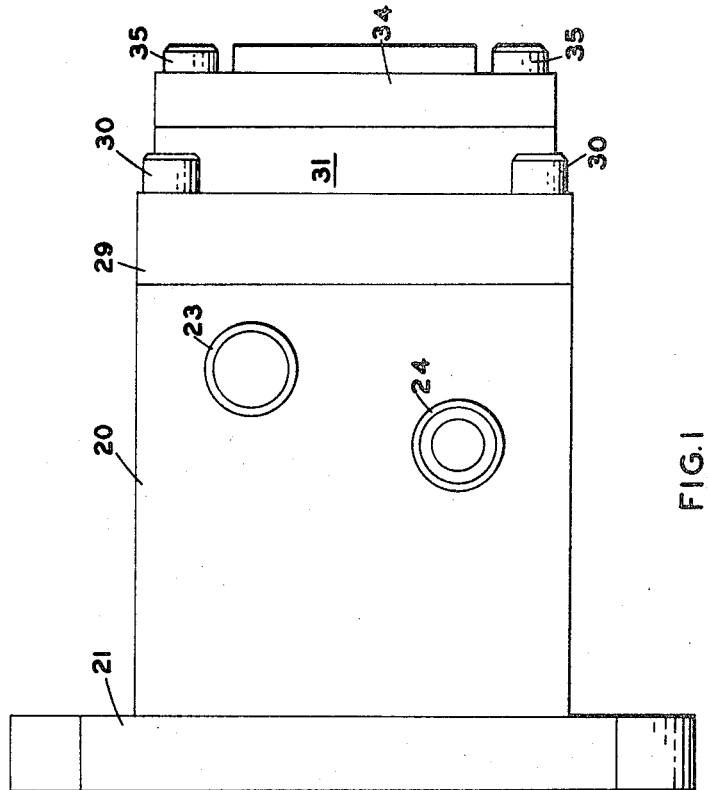
FIGURE 1 is a top plan view of my fluid pressure device.
Figure 2:
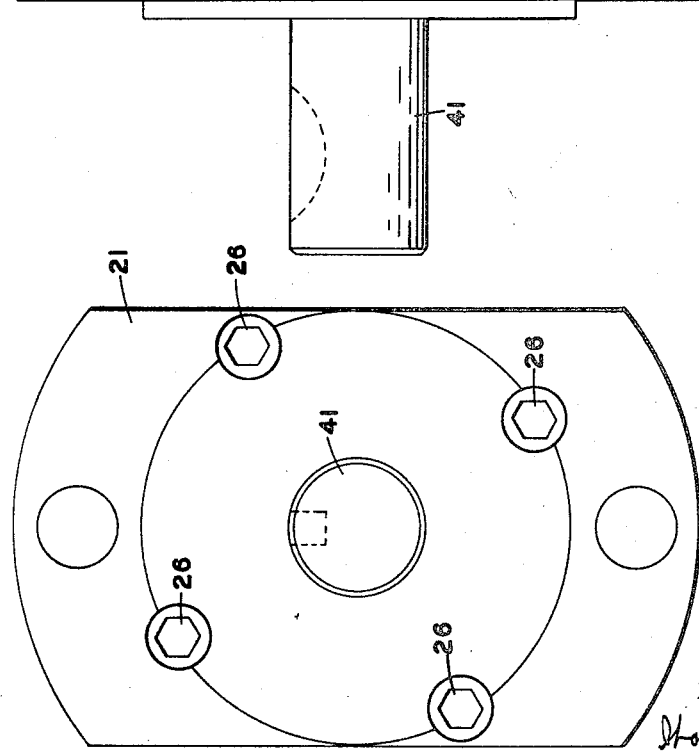
FIGURE 2 is a left-hand end view of my fluid pressure device and shows principally the end mounting flange.
Figure 3:
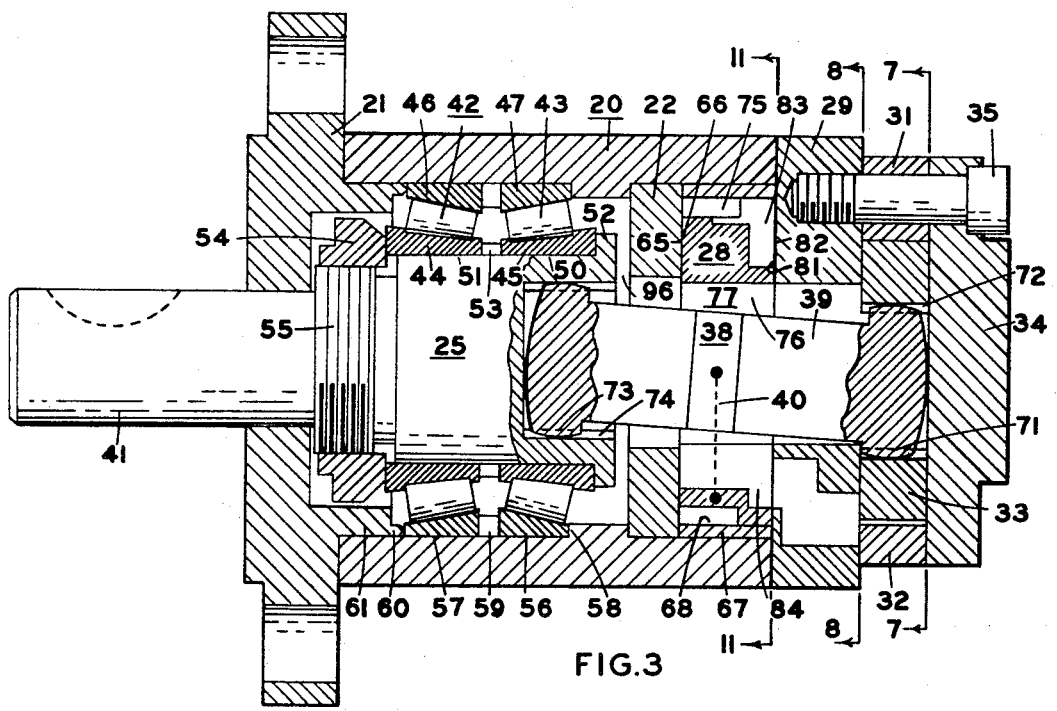
FIGURE 3 is a longitudinal sectional view of FIGURE 1, taken through the vertical center thereof, except that the section through the valve means is taken along the line 23–24 of FIGURE 20.
Figure 6:
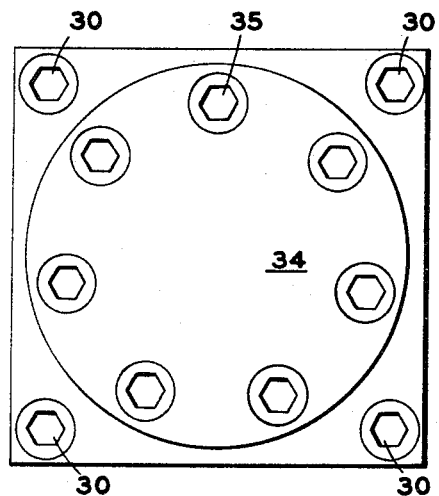
FIGURE 6 is a view of the right-hand end of FIGURE 3.
Figure 7:
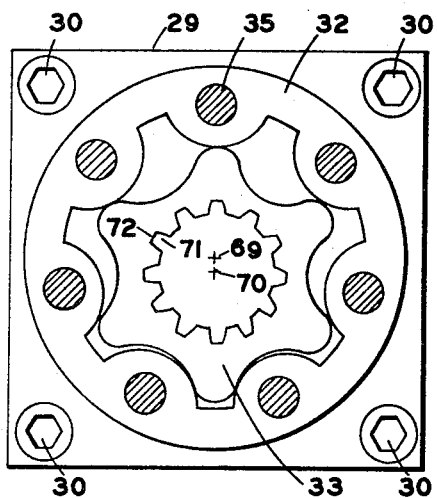
FIGURE 7 is a view taken along the line 7—7 of FIGURE 3, showing the stator-rotor mechanism.
Figure 21:
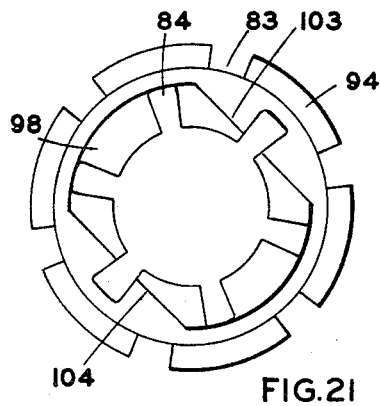
Figure 22:
Figure 20:
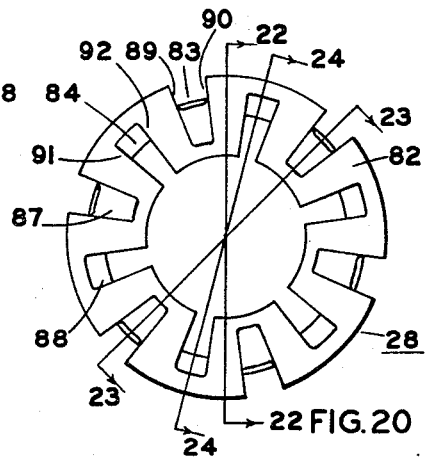
Figure 23:
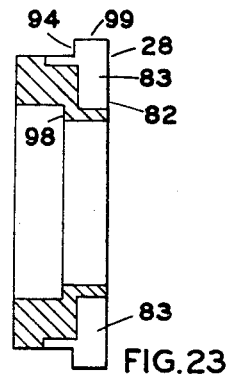
Figure 24:
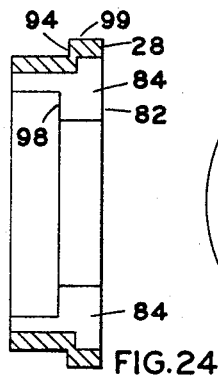
Figure 25:
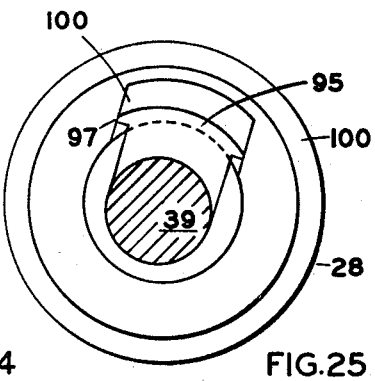
Figures 26, 27:
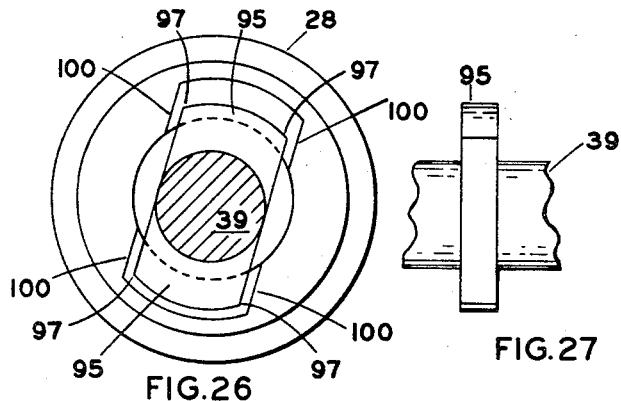
Figure 28:
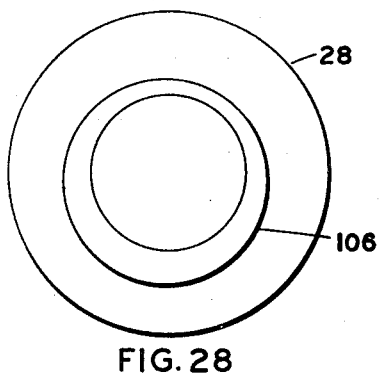
Figures 29, 30:
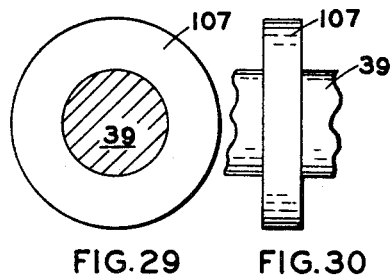
Figure 31:
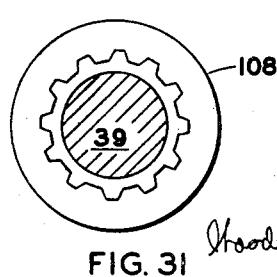

FIGURE 11 is a view taken along the line 11—11 of FIGURE 3, with the rotary valve being omitted, the view being principally a right-hand end view of the hollow housing showing the bushing and the abutment sleeve mounted therein, the view also including a cross-section of the actuating shaft with the square portion thereof shown in a timed relation with respect to the position of the stator-rotor mechanism in FIGURE 7;

FIGURE 12 is a right-hand end view of the wear face only of the rotary valve and is shown in a timed relation with respect to the position of the stator-rotor mechanism in FIGURE 7;

FIGURE 13 is a left-hand end view of the wear face only of the rotary valve and is shown in a timed relation with respect to the position of the stator-rotor mechanism in FIGURE 7;

FIGURE 14 is a left-hand end view of the rotary valve, showing a torque-transmitting member mounted therein and comprising an open annular ring;

FIGURE 15 is a flat side view of the torque-transmitting member shown in FIGURE 14;

FIGURE 16 is an edge view of the torque-transmitting member shown in FIGURE 15;

FIGURE 17 is a left-hand end view of the rotary valve, showing a modified torque-transmitting member comprising a closed annular ring;

FIGURE 18 is a flat side view of the torque-transmitting member shown in FIGURE 17;

FIGURE 19 is an edge view of the torque-transmitting member shown in FIGURE 18;

FIGURE 20 is a view of the rotary valve, looking at the right-hand end thereof, and shows the rotary valve in timed relation with respect to the position of the stator-rotor mechanism in FIGURE 7;

FIGURE 21 is a view of the rotary valve, looking at the left-hand end thereof, and shows the rotary valve in timed relation with respect to the position of the stator-rotor mechanism in FIGURE 7;

FIGURE 22 is a cross-section of the rotary valve taken along the line 22—22 of FIGURE 20;

FIGURE 23 is a cross-section of the rotary valve, taken along the line 23—23 of FIGURE 20;

FIGURE 24 is a cross-section of the rotary valve, taken along the line 24—24 of FIGURE 20;

FIGURE 25 is a view of a modified left-hand end of a the rotary valve, showing a cam finger extending from the actuating shaft for rotating the rotary valve once for each rotation of the actuating shaft;

FIGURE 26 is a view similar to FIGURE 25, but shows a double cam finger spaced from the opposed substantially parallel side wall means between which the cam finger slidably engages;

FIGURE 27 is a fragmentary view of the actuating shaft with the cam-finger extending therefrom;

FIGURE 28 is a view of a modified left-hand end of the rotary valve, showing an eccentric cam wall means;

FIGURE 29 is an end view of the actuating shaft having a concentric cam integrally provided thereon, the concentric cam being disposed to be rotatively mounted in the eccentric cam wall means in FIGURE 28 when the actuating shaft is orbitally mounted;

FIGURE 30 is a fragmentary side view of the actuating shaft and concentric cam in FIGURE 29; and FIGURE 31 is a view similar to FIGURE 29, but shows the concentric cam separately and non-rotatively mounted on the actuating shaft.

For clarity of the invention, the usual shaft and static seals are not shown. Also, all wear parts are made of hardenable or bearing metal and are well lubricated by the operating fluid.

With reference to the drawing, my invention comprises generally a main housing 20 having substantially a square cross-section. A mounting flange 21 is secured to the left-hand end of the housing by screws 26. The housing 20 is hollow from end-to-end, and intermediate the ends of the hollow housing, there is provided a bushing 22 which generally separates the hollow housing into a left-hand end compartment and a right-hand end compartment. Rotatively mounted in the left-hand end compartment is a main shaft 25 having an axis substantially coinciding with the fixed axis. A rotary valve 28 is mounted in the right-hand end compartment and is adapted for rotational movement about the fixed axis. On the right-hand end of the hollow housing, there is mounted a square stationary valve member 29 by means of screws 30. Attached to the right-hand face of the stationary valve member 29, is a stator-rotor mechanism 31 comprising a stator element 32 and a rotor element 33. An end cap 34 encloses the stator-rotor mechanism. The stator-rotor mechnism 31 and the end cap 34 are secured to the statinoary valve member 29 by means of screw 35.

The valve system, which comprises the stationary valve member 29 and the rotary valve member 28, is independently mounted between the main shaft 25 and the stator-rotor mechanism 31, and thus the rotary valve 28 is free from both the radial thrust and the end thrust to which the main shaft may be subjected. The rotary valve 28 is adapted to be rotated about the fixed axis relative to the stationary valve member by universal drive means, indicated by the dotted line 40 and includes an intermediate shaft portion 38 of an actuating shaft 39 which drivingly interconnects the rotor element 33 to the right-hand end of the main shaft 25. The universal drive means may embody rotational phasing, as will be explained later.

The main shaft 25 comprises an enlarged internal portion having a reduced external portion 41 extending axially outwardly of the main housing 20 through the mounting flange 21. The enlarged internal portion of the main shaft is supported preferably by tapered roller bearings 42 and 43, respectively, having inner cones 44 and 45 and outer cups 46 and 47. The tapered roller bearings are disposed side-by-side with the bearing 42 disposed oppositely to that of the tapered roller bearing 43. Thus, the tapered roller bearings 42 and 43, in combination with each other, provide for radial thrust as well as for end thrust in both axial directions, with the tapered roller bearing 42 disposed to take the greater part of the radial load. The enlarged internal portion of the main shaft 25 is provided with a first portion 50 upon which the inner cone 45 is pressed and a second portion 51 upon which the inner cone 44 is pressed. The portion 50 terminates into a shoulder 52 against which the right-hand end of the inner cone 45 abuts. The two inner ends of the cones 44 and 45 are separated by a shaft spacer ring 53. Mounted against the left-hand end of the inner cone 44 is a tightening nut 54 which threadably engages male threads 55 provided on a reduced stepped portion of the shaft. Upon tightening the nut 54, the two tapered roller bearings 42 and 43 are securely mounted upon the main shaft. The tightening nut 54 may be provided with a built-in locking feature to prevent loosening.

Figures 4, 5:
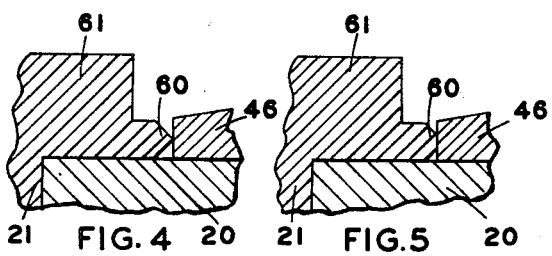
FIGURE 4 is an enlarged fragmentary cross-sectional view of the bearing fixation means in FIGURE 3 to accommodate for axial tolerance in matching the position of the bearing in the bore of the housing, the view showing the position of the parts before engagement of the fixation means.
FIGURE 5 is av iew similar to FIGURE 4, but shows the position of the parts after engagement of the fixation means.

The internal surface of the left-hand end compartment of the hollow housing 20 is provided with a first bore portion 56 into which the outer cup 47 is pressed and a second bore portion 57 into which the outer cup 46 is pressed. The bore portion 56 terminates into a shoulder 58 against which the right-hand end of outer cup 47 abuts. The two inner ends of the cups 46 and 47 are separated by a bore spacer ring 59. As shown in FIGURES 3, 4 and 5, the outer cup 46 is secured against axial movement to the left by axial fixation means, indicated by the reference character 60. The axial fixation means 60 comprises an annular V-shaped or pointed rib which axially abuts against the outer cup 46. The rib may be provided on the projecting end of a cylindrical body 61 constructed integrally with the flange 21. By pressing the flange 21 against the end of the housing 20, the pointed rib is coined against the outer cup 46, with the result that the fixation means accommodates for axial tolerance in matching the position of the cup 46 in the bore of the housing 20. The pressure required to coin the axial fixation means is greater than the end-wise thrust load to which the bearing means 42 may be subjected in operation, in which case the outer cup 46 is resisted against axial movement to the left. In assembly the axial fixation means is axially fixable (coinable) and is disposed to resist an axial thrust load greater than the axial thrust load to which the bearing means 42 may be subjected in operation. The FIGURE 4 shows the axial fixation means 60 before it is coined or fixed and the FIGURE 5 shows the axial fixation means after it has been coined. The main shaft is entirely supported by the two tapered roller bearings 42 and 43. The reduced external shaft portion 41 where it passes axially through the end mounting flange 21 is not journalled therein but rotates therein with a small radial clearance which is adapted to be sealed off by suitable shaft seal means, not shown. The tapered roller bearing assembly is claimed to be new and novel to the extent that the respective inner cones and the respective outer cups are spaced apart by spacer rings, with the inner cones held against axial movement on the shaft by a tightening nut and with the outer cups held against axial movement in the housing by axial fixation means. With my bearing assembly, the external shaft portion 41 is disposed to withstand a heavy load.

The main housing 20 is provided with first and second fluid ports 23 and 24. When operated as a fluid motor, the first fluid port 23 constitutes an inlet or high pressure port and the second fluid port 24 constitutes an outlet port or low pressure.

In the description, my device will be described as a fluid motor, but it is understood that it may be utilized for any other related purpose, particularly as a pump.

As illustrated in FIGURE 7, the stator element 32 has seven internal teeth which defines the outer wall of a fluid compartment. The rotor element 33 has six external teeth, one less than that of the stator element. The stator element may be described as having ($n$) number of internal teeth, and the rotor element may be described as having ($n-1$) number of external teeth. The stator element has a center 69, usually referred to as the fixed or stationary axis since the stator element is stationarily mounted and does not rotate. In this application and claims, the expression "fixed stator axis" or simply "fixed axis," includes not only the fixed axis of the stator, but any axis which coincides, or is in axial alignment therewith.

The rotor 33 has a movable axis, identified by the reference character 70, and is radially spaced from and moves in an orbital path about the fixed axis 69 of the stator. The orbital path of the movable axis 70 is a true circle with its center coinciding with the fixed axis of the stator. The diameter of the true circle, orbital path, is equal to the difference in the radial dimension between the crest contour and the root contour of a stator tooth. Upon relative movement between the rotor and the stator, the movable axis 70 of the rotor orbits in a true circle about the fixed axis of the stator. As the rotor moves within the stator, the intermeshing teeth of the rotor and stator divide the fluid compartment confined therebetween into high and low pressure chambers along a revolving divisional line passing substantially diametrically through the fixed axis of the stator. For the position in FIGURE 7, the divisional line is substantially diametrically vertical. For the position shown in FIGURE 7, the divisional line may be more properly described as a divisional tapering band rather than a line and comprises substantially a slender triangle having an apex at the point where the top rotor tooth in FIGURE 7 touches or contacts the arcuate surface of the stator contour and having a base defined by the distance between the sealing contact engagement on opposite sides of the bottom rotor tooth when fitting full-depth into the bottom stator tooth. To rotate the rotor 33 in a clockwise direction, the chambers on the left-hand side of the revolving divisional line or tapering band become high pressure chambers and the chambers on the right-hand side become low pressure chambers. The high and low pressure chambers alternately expand and contract as the rotor and stator move relative to each other. The divisional line or tapering band continually revolves in a counter-clockwise direction as the rotor rotates in a clockwise direction within the stator.

As shown in FIGURE 3, the actuating shaft 39 has a right-hand end portion provided with male spline teeth 71 which fit within female spline teeth 72 in the rotor, being referred to herein as first connection means. Thus, the right-hand end portion of the actuating shaft 39 is disposed for rotational movement about its own movable axis and for orbital movement about the fixed axis of the stator. The connection means between the left-hand end portion of the actuating shaft 39 and the main shaft 25, herein referred to as second connection means, also compromises male spline teeth 73 on the actuating shaft 39 which fit within female spline teeth 74 in the central core of the main shaft 25. The left-hand end portion of the actuating shaft, that is the second connection means, is disposed for rotational movement only about the fixed axis of the stator. The third connection means compromises the universal drive means indicated by the dotted line 40 and includes an intermediate square shaft portion 38 which is provided with a torque-transmitting member 78 for engaging the rotary valve 28 for rotating same about the fixed axis once for each rotation of the actuating shaft, see FIGURES 14–19, inclusive. As illustrated, the intermediate square shaft portion 38 passes through an enlarged opening 76 in the rotary valve member 28 and is disposed for rotational movement therein about its own movable axis and orbital movement about the fixed axis. The orbital diameter which the movable axis described about the fixed axis at the intermediate shaft portion 38 is, of course, less than the orbital diameter at the right-hand end portion of the actuating shaft. The torque-transmitting member 78 comprises an open annular washer or member (substantially a C-shaped member) having a central opening or slot large enough to pass over and slidably engage the intermediate square shaft portion 38 of the actuating shaft 39. The torque-transmitting member 78 and the intermediate square shaft portion 38 respectively have first and second interengageable torque transmitting wall means slidable with respect to each other in a first direction for transmitting torque therebetween. The torque-transmitting member 78 may slide on the square cross-section by an amount to accommodate for the orbital movement of the intermediate shaft portion 38. The outside of the open annular torque-transmitting washer or member 78 is provided with oppositely disposed contacting wall means 101 and 102 which slidably and respectively fit between two oppositely disposed parallel wall surfaces 103 and 104 in the rotating valve member 28. The opposed contacting wall means 101 and 102 may slide within the wall surfaces 103 and 104 by an amount to accommodate for the orbital movement of the intermediate shaft portion 38. The direction at which the torque-transmitting member slides with reference to the rotating valve is perpendicular to the direction at which the torque-transmitting member slides with reference to the intermediate square shaft portion 38. The rotary valve 28 is caused to be rotated once for each rotation of the intermediate shaft portion 38. The drive means thus described constitutes universal drive means and provides for rotating the rotary valve relative to the stationary valve once for each rotation of the actuating shaft 39.

The operation of the rotary valve is independent of the load and thrust on the main shaft. The FIGURES 17, 18 and 19 show a closed annular torque-transmitting washer or member 105 which operates in substantially the same manner as the open annular torque-transmitting washer or member 78. The central opening in the closed-annular member 105 is large enough to pass over the male spline teeth on the end of the actuating shaft 39. The intermediate square shaft portion 38 may be slightly larger for the closed annular torque-transmitting member. In both the closed and open annular torque-transmitting members, the fluid may flow therethrough, as open spaces are needed to accommodate for the slidable movements and these open spaces are ample to accommodate for the flow of fluid therethrough. The internal wall surfaces 103 and 104 of the rotary valve 28 between which the torque-transmitting members 78 or 105 slidably operate are shown in FIGURE 21 shows the wall surfaces 103 and 104 in a timed position with respect to the position of the stator-rotor mechanism in FIGURE 7. The torque-transmitting members 78 or 105 provide for rotating the rotary valve once for each rotation of the actuating shaft.

In my invention, the valve system means, which compromises the rotary valve member 28 and the stationary valve member 29, is disposed to provide a first series of commutating fluid connection means between the first fluid port 23 and the expanding fluid chambers in the stator-rotor mechanism and a second series of commutating fluid connection means between the contracting fluid chambers in the stator-rotor mechanism and the second fluid port 24. To this end, the stationary valve member 29 has seven fluid openings 79 communicating respectively with the spaces between the internal teeth of the stator element, see FIGURE 8. The stationary valve member 29 has a stationary valve face 81 and the rotary valve member 28 has a rotary valve face 82 disposed to rotate against the stationary valve face and make a sealing engagement therewith. The seven fluid openings 79 in the stationary valve member terminate respectively in the stationary valve face 81 with the terminating fluid openings being identified by the reference characters 80 and being disposed circumferentially about the fixed axis and spaced at annular intervals thereabout substantially $360/n$ degrees from each other, where ($n$) equals seven, being the number of fluid openings 80 terminating in the stationary valve wear face 81, see FIGURE 9. The first series of commutating connection means, comprising six in number, terminate respectively in the rotary valve wear face 82. These six commutating connection means (first series) preferably comprise six fluid slot means 83 respectively having a closed inner end portion and an open outer end portion in constant fluid communication with the first fluid port 23. The second series of commutating fluid connection means, likewise comprising six fluid slot means, are identified by the reference character 84 and respectively have a closed outer end portion and an open inner end portion in constant fluid communication with the second fluid port 24.

The terminating fluid openings 80 comprises generally an elongated oval and are each defined by opposed side portions 85 and 86 with each side portion extending in substantially a radial direction with respect to the fixed axis. The opposed side portions 85 and 86 for the respective fluid openings 80 have substantially the same fixed angle therebetween and define the circumferential width thereof. The first series of fluid slot means 83 are, generally, in the shape of a deep external V-slot, with each being defined by opposing side wall portions 89 and 90. As shown in FIGURE 12, the side wall portions 89 and 90 extend in substantially a radial direction with respect to the fixed axis. The respective side wall portions 89 and 90 for the first series of fluid slot means 83 and the respective side wall portions 91 and 92 for the second series of fluid slot means 84 have substantially the same fixed angle therebetween and defines the circumferential width of the respective fluid slot means. The fixed angle for the respective fluid slot means is substantially the same as that for the terminating fluid openings 80 which means that the circumferential width for the terminating fluid openings 80 and for the fluid slots 83 and 84 are all the same. The facing lands between the fluid slot means 83 and 84 have the same circumferential width as the fluid slot means themselves. Thus, in FIGURES 9 and 12, the circumferential width, that is the width measured in a circumferential direction from side-to-side is the same for all the terminating fluid openings 80, for all the inlet fluid slots 83 (first series), for all the exhaust fluid slots 84 (second series), and for all the facing lands between the fluid slots 83 and 84. The registration of the fluid slots 83 and 84 with the terminating openings 80 provides ample fluid flow to and from the stator-rotor mechanism without undue restriction.

The first and second series of fluid slot means 83 and 84 are alternately disposed with respect to each other and are circumferentially disposed relative to the fixed axis and spaced at annular intervals thereabout substantially $360/2(n-1)$ degrees from each other, where ($n$) is the number of fluid openings 80 terminating in the stationary valve face. Thus, the fluid slot means are spaced at annular intervals substantially 30 degrees from each other. As illustrated in FIGURE 3, the bushing 22 has its outer circumference tightly pressed (fluid seal tight) into the hollow housing. The bushing 22 has a side wall surface constituting stationary face wall means 65 disposed substantially parallel to and spaced axially from the stationary valve face 81. The rotary valve member 28 is disposed between the stationary face wall means 65 and the stationary valve face 81 and has a left-hand rotary end face 66 sealingly engaging the stationary face wall means 65. The bushing 22 is axially secured in place by an abutment sleeve 67 which has an internal wall surface 68 surrounding and radially spaced from the rotary valve member 28 and defines therewith external annular fluid-line chamber means or a reservoir 75 which extends all the way around the external surface of the rotary valve member 28. The first fluid port 23 is disposed substantially directly above and in substantially vertical alignment with the annular fluid-line reservoir 75. As illustrated in FIGURE 11, a vertically extending duct 36 in the hollow body 20 connects the external fluid-line chamber means 75 in constant fluid communication with the first fluid port 23. The right-hand end of the external fluid-line chamber means 75 is in constant fluid communication with the six fluid slot means 83 of the first series, which means that the six fluid slot means 83 of the first series are respectively in constant fluid communication with the first fluid port 23. Thus, the external fluid-line chamber means 75 is at the entrance of the valve means to give improved valve operation. The left-hand end of the fluid-line chamber means 75 extends to the stationary wall face means 65 of the bushing 22.

The enlarged internal opening 76 in the rotary valve member 28, through which the actuating shaft 39 extends, is in constant fluid communication with the second fluid port 24. The path of the constant fluid communication is through a radially extending space 96 between the main shaft 25 and the left-hand side of the bushing 22, and thence through a vertically extending duct 37 which connects the radial space 96 with the second fluid port 24, see FIGURE 11. The inner open end of the second series of fluid slots 84 are in constant fluid communication with the enlarged fluid opening 76 in the rotary valve member 28, which means that the six fluid slot means 84 of the second series are respectively in constant fluid communication with the second fluid port 24. Thus, the enlarged fluid opening 76 in the rotary valve member 28, together with the radial space 96 as well as the space around the main shaft 25 constitutes internal fluid line chamber means or a reservoir 77 at the exit of the valve means to give improved valve operation.

In operation as a fluid motor, high pressure fluid from the high pressure port 23 commutatively flow through the first series of commutating fluid connection means 83 of the rotary valve into the fluid openings 80 of the stationary valve member 29 and thence into the expanding pressure fluid chambers in the stator-rotor mechanism and drives the rotor 33 in a clockwise rotational direction within the stator 32. As the rotor is driven, the exhaust fluid in the low pressure contracting chambers commutatively flows through the fluid openings 80 of the stationary valve 29 into the second series of fluid commutating connection means 84 of the rotary valve and thence to the low pressure port 24. As the rotor is driven by the high pressure fluid, it operates the main shaft 25 through the actuating shaft 39.

The registration of the fluid connection means provided by the rotating valve face 82 in sealing engagement with the stationary valve face 81 is such that there is a first series of commutating fluid connections between the high pressure port 23 and the expanding fluid chambers in the stator-rotor mechanism and a second series of commutating fluid connections between the contracting fluid chambers and the low pressure port 24. The rotating valve 28 is independent of any radial thrust or of any end thrust to which the main shaft 25 may be subjected. Also the rotating valve 28 is substantially free from any radial thrust or any end thrust due to fluid pressure acting thereupon. This balance results from the fact that the fluid pressure acts upon oppositional wall portions which may substantially cancel out each other. Thus, the fluid slot means 83, first series, have a back wall portion 87 extending between the respective side wall portions 89 and 90 thereof. This back wall portion 87 is axially spaced from the stationary valve face 81 and is exposed to fluid pressure tending to exert a separating axial force for separating the rotary valve face 82 from the stationary valve face 81. The fluid pressure acting upon the total area of these back wall portions 87 may be substantially off-set by the fluid pressure acting upon the external oppositional wall means 94 at the right-hand end of the rotary valve, see FIGURES 21–24. Similarly, the fluid slot means 84, second series, have a back wall portion 88 between the respective side wall portions 91 and 92 thereof. This back wall portion 88 is axially spaced from the stationary valve face 81 and is exposed to fluid pressure tending to exert a separating axial force for separating the rotary valve face 82 from the stationary valve face 81. The fluid pressure acting upon the total area of these back wall portions 88 may be substantially off-set by the fluid pressure acting upon the internal oppositional wall means 98 at the left-hand end of the rotary valve, see FIGURES 21–24. Thus, the axial fluid thrust may be substantially cancelled out. There is substantially no radial fluid thrust acting upon the rotary valve 28 since the fluid extends around the entire circumference thereof, as well as within the central opening thereof.

The right-hand end of the rotary valve 28 has a stepped, segmental circumferential rim section 99 of a larger diameter than the remaining outer cylindrical surface of the valve which, in part, defines the external annular fluid-line chamber means 75. In mounting the rotary valve in the abutment sleeve 67, it is preferable that the outer surface of the segmental circumferential rim section 99 be rotatively mounted as a bearing within the internal wall surface 68 of the abutment sleeve, whereby it functions as a bearing to support the rotary valve.

As an object of the invention, the FIGURES 25, 26 and 27 show a further modification of the universal drive means embodying rotational phasing and comprises a cam actuating finger 95 extending from the actuating shaft 39. The actuating finger 95 is preferably integral with the actuating shaft and has two oppositely disposed cam-actuating contact portions 97 which respectively slide between two substantially parallel cam-follower wall means 100. The two contact portions 97 with respect to radial lines passing therethrough preferably define included angle therebetween of approximately 90 degrees. As the actuating shaft 39 orbits, the contact portions 97 slide up-and-down (piston fashion) relative to the parallel wall means 100. The action is such that the rotating valve 28 is rotated once for each rotation of the actuating shaft 39. In FIGURE 25, the contact portions 97 of the cam finger 95 make a relatively close sliding contact fit with the cam-follower wall means 100. The clearance is sufficient to permit orbiting of the actuating shaft. In operation there is a disposition for the rotary valve to have a circumferential rotational phasing with respect to the rotation of the actuating shaft 39. During certain portions of the orbit movement of the actuating shaft, the rotational phasing has the effect of subtracting from the rotation of the actuating shaft, with the result that the speed of rotation of the rotary valve is reduced. During other portions of the orbit movement, the rotational phasing has the effect of adding to the rotation of the actuating shaft, with the result that the speed of rotation of the rotary valve is increased. The rotational phasing makes a fresh start at the beginning of each orbit and terminates at the end of each orbit. The amount of the circumferential displacement resulting from the rotational phasing is a function of the radius of the orbital movement at the intermediate portion 38 of the actuating shaft. The rotational phasing has the effect of varying the timing of the rotary valve with respect to the movements of the rotor within the stator and produces a new valving action.

In FIGURE 26, which shows two oppositely disposed finger cams, instead of one in FIGURE 25, the clearance between the opposed cam contact portions 97 and the cam-follower wall means 100 is shown to be increased. The amount of the clearance on each side may be substantially equal to the radius of the orbital movement at the intermediate portion 38 of the actuating shaft. The action produced in FIGURE 26 also gives rotational phasing and provides ample clearance to permit orbiting of the actuating shaft. The clearance spaces in FIGURE 26 renders it unnecessary to have the laterally extending tips upon which the contact portions 97 are provided. The corner edges become the contact portions 97.

FIGURES 28, 29, 30 and 31 show a further modification of the universal drive means and comprises eccentric wall means 106 in the rotary valve (see FIGURE 28) into which is rotatively mounted a concentric cam 107 (see FIGURE 29), when the actuating shaft is in orbiting position. In operation, the orbiting movement of the actuating shaft causes the concentric cam 107 to become eccentric in movement within the eccentric wall means 106, with the result that the rotary valve is rotated once for each rotation of the shaft. In FIGURE 29, the concentric cam 107 is shown integral with the actuating shaft. In FIGURE 31, the concentric cam 108 is shown separate from the actuating shaft, but non-rotatively connected thereto by the illustrated gear teeth. The operation of the concentric cams 107 and 108 are substantially the same. The universal drive means as shown in this application provide for producing an action whereby the rotary valve is rotated once for each rotation of the actuating shaft, with the further provision that the construction shown in FIGURES 25, 26 and 27 embody an action which has been described as rotational phasing to provide a new valve action.

As shown in FIGURE 24, the second series of fluid commutating connection means 84 (exhaust slots) are shown as extending from one end of the rotary valve to the other. The terminating ends for these exhaust slots 84 are shown in FIGURE 21. For the sake of clarity, these terminating ends are not shown in FIGURES 25, 26 and 28.

The rotary valve 28, as shown in FIGURE 20, represents a timed position with respect to the stationary valve shown in FIGURE 9 and with respect to the stator-rotor mechanism shown in FIGURE 7. As the rotary valve 28 in FIGURE 20 is rotated in a clockwise direction, the registration of the fluid slots 83 and 84 with the fluid openings 80 in the stationary valve 29, directs pressurized fluid to flow into the stator-rotor mechanism and directs exhaust fluid to flow therefrom, causing the rotor 33 to rotate in a clockwise direction. All the universal drives disclosed herein are disposed to maintain this proper timed relationship between the actuating shaft 39 and the rotary valve 28 for rotating the rotary valve in its proper timed relationship with the stationary valve 29 and the stator-rotor mechanism.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a fluid pressure device having a stator element and a rotor element having intermeshing teeth and constituting a stator-rotor mechanism, one of said elements having [n] number of internal teeth defining an outer wall of a fluid compartment, the other of said elements disposed in said fluid compartment and having less than [n] number of external teeth, said stator element having a fixed axis, said rotor element having a movable axis, said rotor element having a rotational movement about its own movable axis and an orbital movement about said fixed axis, said intermeshing teeth upon relative movement between said elements defining alternately expanding and contracting fluid chambers, valve system means including rotary valve means for controlling the entrance of fluid to and the exit of fluid from said alternately expanding and contracting fluid chambers, actuating means including an actuating shaft for actuating said rotary valve means, said actuating shaft having a first end portion operatively connected to said rotor element and a second end portion operatively disposed for rotational movement substantially free from orbital movement, said actuating shaft having an actuating shaft portion located intermediate said first and second end portions and operatively disposed for rotational movement about said movable axis and for orbital movement about said fixed axis, and drive means located between said first and second end portions of said actuating shaft and interconnecting said actuating shaft portion and said rotary valve means for rotating said rotary valve means one rotation for each rotation of said actuating shaft portion.

2. The structure of claim 1, wherein said rotary valve means has cam-follower wall means, and wherein said shaft portion has cam-actuating wall means operatively engaging said cam-follower wall means for rotating said rotary valve means once for each rotation of said actuating shaft.

3. The structure of claim 2, wherein said cam-follower wall means and said cam-actuating wall means are disposed for eccentric movement with respect to said fixed axis.

4. The structure of claim 2, wherein said cam-follower wall means includes first and second substantially parallel opposed walls and wherein said cam-actuating wall means includes finger means having third and fourth opposed contacting walls slidably and respectively engaging said first and second substantially parallel opposed walls.

5. The structure of claim 1, wherein said drive means includes first and second interengageable cam wall means disposed for eccentirc movement with respect to said fixed axis, said first and second cam wall means being respectively provided on said actuating shaft portion and on said rotary valve means.

6. The structure of claim 1, wherein said drive means includes substantially an annular member, said substantially an annular member and said actuating shaft portion respectively include first and second interengageable torque-transmitting wall means slidable with respect to each other in a first direction for transmitting torque therebetween, and wherein said substantially an annular member and said rotary valve means respectively include third and fourth interengageable torque-transmitting wall means slidable with respect to each other in a second direction substantially perpendicular to said first direction for transmitting torque therebetween.

7. The structure of claim 6, wherein said substantially an annular member comprises an open-ring partially surrounding said shaft portion.

8. The structure of claim 6, wherein said substantially an annular member comprises a closed-ring completely surrounding said shaft portion.

9. In a fluid pressure device having a housing provided with first and second fluid port means, said housing having end wall means, a stator element and a rotor element having intermeshing teeth and constituting a stator-rotor mechanism, one of said elements having [n] number of internal teeth defining an outer wall of a fluid compartment, the other of said elements disposed in said fluid compartment and having less than [n] number of external teeth, said stator element having a fixed axis, said rotor element having a movable axis, said rotor element having a rotational movement about its own movable axis and an orbital movement about said fixed axis, said intermeshing teeth upon relative movement between said elements defining first and second alternately operating fluid chambers, valve system means comprising first and second relatively movable valve means for controlling the entrance of fluid to and the exit of fluid from said alternately expanding and contracting fluid chambers, said first valve means comprising a stationary valve member stationarily mounted with respect to said stator element and said second valve means comprising a rotary valve member driven by said rotor element, said stationary valve member having face wall means including a stationary valve face disposed transversely with respect to said fixed axis, means for connecting said stationary valve member to said housing with said face wall means of said stationary valve member facing against said end wall means of said housing, said rotary valve member being mounted in said housing and having external wall surface means and centrally disposed internal wall surface means, said rotary valve member also having a rotary valve face in fluid sealing engagement with said stationary valve face, said stationary valve member having fluid openings communicating respectively with said fluid chambers, said fluid openings terminating in said stationary valve face with said terminating fluid openings disposed circumferentially relative to said fixed axis, first fluid chamber means having chamber wall means including said external wall surface means of said rotary valve member, first passage means in said housing connecting said first fluid chamber means in constant fluid communication with said first fluid port means, second fluid chamber means having chamber wall means including said internal wall surface means of said rotary valve member, second passage means in said housing connecting said second fluid chamber means in constant fluid communication with said second fluid port means, said rotary valve member having first body portion means separating fluid in said external fluid chamber means from said rotary valve face, said first body portion means having a wall surface constituting a portion of said external wall surface means of said rotary valve member, a first series of commutating fluid connection means interconnecting said wall surface of said first body portion means and said rotary valve face, said first series respectively terminating in said rotary valve face and constituting a first series of terminal commutating fluid connection means, said rotary valve member having second body portion means separating fluid in said internal fluid chamber means from said rotary valve face, said second body portion means having a wall surface constituting a portion of said internal wall surface means of said rotary valve member, a second series of commutating fluid connection means interconnecting said wall surface of said second body portion means and said rotary valve face, said second series respectively terminating in said rotary valve face and constituting a second series of terminal commutating fluid connection means, said first and second series of said terminal commutating fluid connection means being circumferentially disposed relative to said fixed axis and commutatingly registering with said terminating fluid openings in said stationary valve face and actuating means driven by said rotor element for rotating said rotary valve member relative to said stationary valve member.

10. The structure of claim 9, wherein said stationary valve member has [$n$] number of fluid openings communicating respectively with said fluid chambers, said terminating fluid openings being spaced about said fixed axis at annular intervals substantially $360/n$ degrees from each other, said first and second series of terminal commutating fluid connection means in said rotary valve face respectively comprising [$n-1$] in number, said first and second series of said terminal commutating fluid connection means in said rotary valve face being alternately disposed with respect to each other and being circumferentially disposed relative to said fixed axis and spaced at annular intervals thereabout substantially $360/2[n-1]$ degrees from each other, said rotary valve face in sealing engagement with said stationary valve face constituting fluid sealing means between said first and second alternate series of terminal commutating fluid connection means.

11. The structure of claim 10, having stationary face wall means disposed substantially parallel to and spaced axially from said stationary valve face, said rotary valve member disposed between said stationary face wall means and said stationary valve face, said rotary valve member having a rotary end face sealingly engaging said stationary face wall means and constituting a fluid seal between said first chamber means and said second chamber means.

12. The structure of claim 10, wherein said first and second series of terminal commutating fluid connecting means respectively include fluid slot means.

13. The structure of claim 12, wherein said first series of fluid slot means respectively have a closed inner end portion and an open outer end portion, and wherein said second series of fluid slot means respectively have a closed outer end portion and an open inner end portion.

14. The structure of claim 13, wherein said terminating fluid openings are each defined by opposed side portions with each side portion extending in substantially a radial direction with respect to said fixed axis, said substantially radially extending opposed side portions for the respective fluid openings having substantially the same fixed angle therebetween and defining the circumferential width of said terminating fluid openings, and wherein said fluid slot means are each defined by opposed side wall portions with each side wall portion extending in substantially a radial direction with respect to said fixed axis, said substantially radially extending opposed side wall portions for the respective fluid slot means having substantially the same fixed angle therebetween and defining the circumferential width of said fluid slot means, said fixed angle for said fluid slot means being substantially the same as that for said terminating fluid openings, whereby said fluid slot means and said terminating fluid openings have substantially the same circumferential width.

15. The structure of claim 14, wherein said fluid slot means each have a back wall portion extending between said opposed side wall portions thereof, said back wall portions being axially spaced from said stationary valve face and exposed to fluid pressure tending to exert a separating axial force for separating said rotary valve face from said stationary valve face, said rotary valve member having oppositional wall portion means against which fluid pressure acts for exerting an axial force in opposition to said separating axial force.

16. In a valve system for a fluid mechanism having a stator and a rotor, said valve system having at least a rotary valve mounted for rotation about a fixed axis, the improvement of drive means embodying rotational phasing means having interengageable wall means for driving said rotary valve from said rotor and comprising a wobble shaft operatively connected to said rotor, said wobble shaft having an actuating shaft portion disposed for orbital and rotational movement, said interengageable wall means of said rotational phasing means rotating said rotary valve one rotation for each rotation of said actuating shaft portion, said one rotation of said rotary valve being in the same direction as the rotation of said shaft portion and being designated as a forward direction, said interengageable wall means of said rotational phasing means in response to a portion of each orbital movement of said actuating shaft portion relatively rotating said rotary valve in a reverse direction to reduce the resultant speed thereof and in response to another portion of each orbital movement of said actuating shaft portion relatively rotating said rotary valve in a forward direction to increase the resultant speed thereof.

17. The structure of claim 2, wherein said external cam-actuating means is integrally provided on said shaft portion.

18. The structure of claim 2, wherein said external cam-actuating means is separately and non-rotatively mounted on said shaft portion.

19. The structure of claim 1, wherein said drive means embodies rotational phasing means, said rotational phasing means having operatively engageable wall means for relatively rotating said rotary valve means in a direction opposite to that of said one rotation of said rotary valve means to reduce the resultant speed thereof in response to a portion of each orbital movement of said actuating shaft portion and for relatively rotating said rotary valve means in a direction the same as that of said one rotation of said rotary valve means to increase the resultant speed thereof in response to another portion of each orbital movement of said actuating shaft portion.

20. The structure of claim 9, wherein said terminating fluid openings respectively define substantially an elongated oval having a lengthwise dimension in generally a radial direction and a transverse dimension in generally a circumferential direction, said lengthwise dimension having a maximum length greater than the maximum width of said transverse dimension.

21. The structure of claim 9, wherein said terminating fluid openings respectively define a width at their maximum dimension substantially matching the width of said terminal commutating fluid connection means at their maximum dimension.

22. The structure of claim 9, wherein said rotary valve face includes wall portion means against which fluid pressure acts tending to exert a separating axial force for separating said rotary valve face from said stationary valve face, and wherein said wall surface of said first body portion means of said rotary valve member includes oppositional wall structure means against which fluid pressure acts for exerting an axial force in opposition to said separating axial force.

23. The structure of claim 9, wherein said rotary valve face includes wall portion means against which fluid pressure acts tending to exert a separating axial force for separating said rotary valve face from said stationary valve face, and wherein said wall surface of said second body portion means of said rotary valve member includes oppositional wall structure means against which fluid pressure acts for exerting an axial force in opposition to said separating axial force.

24. In a fluid pressure device having a stator element and a rotor element constituting a fluid stator-rotor mechanism, said stator element having a fixed axis, said rotor element having a movable axis, said rotor element having a rotational movement about its own movable axis and an orbital movement about said fixed axis, valve system means including rotary valve means for controlling the entrance of fluid to and the exit of fluid from said fluid stator-rotor mechanism, actuating means including an actuating shaft for transmitting a driving force from said rotor element to said rotary valve means, said actuating shaft having a first end portion operatively connected to said rotor element and a second end portion operatively disposed for rotational movement substantially free from orbital movement, said actuating shaft having an actuating shaft portion located intermediate said first and second end portions and operatively disposed for rotational movement about said movable axis and for orbital movement about said fixed axis, said intermediate actuating shaft portion being disposed inwardly of said rotary valve means and being substantially longitudinally co-extensive therewith, and drive means located between said first and second end portions of said actuating shaft for driving said rotary valve means, said drive means being disposed transversely of said intermediate actuating shaft portion and extending outwardly to said rotary valve means and interconnecting said intermediate actuating shaft portion and said rotary valve means, whereby said driving force is transmitted from said rotor element to said first end portion of said actuating shaft and then longitudinally along said actuating shaft to said drive means and thence outwardly through said drive means to said rotary valve means.

25. In a fluid pressure device having housing means provided with end wall means, a stator element and a rotor element constituting a fluid stator-rotor mechanism defining alternately operating fluid chambers, said stator element having a fixed axis, said rotor element having a movable axis, said rotor element having a rotational movement about its own movable axis and an orbital movement about said fixed axis, valve system means comprising first and second relatively movable valve means for controlling the entrance of fluid to and the exit of fluid from said alternately operating fluid chambers, said first valve means comprising stationary valve means stationarily mounted with respect to said stator element and said second valve means comprising rotary valve means driven by said rotor element, said stationary valve means having face wall means including a stationary valve face disposed transversely with respect to said fixed axis, means for connecting said stationary valve means to said housing means with said face wall means of said stationary valve means facing against said end wall means of said housing means, said housing means and said stationary valve means constituting enclosure means for said rotary valve means, first and second fluid port means in said enclosure means, said rotary valve means having external wall surface means and centrally disposed internal wall surface means, said rotary valve means also having a rotary valve face in fluid sealing engagement with said stationary valve face, said stationary valve means having fluid openings communicating respectively with said operating fluid chambers in said stator-rotor mechanism, said fluid openings terminating in said stationary valve face with said terminating fluid openings disposed circumferentially relative to said fixed axis, first fluid chamber means having chamber wall means including said external wall surface means of said rotary valve means, first passage means in said enclosure means connecting said first fluid chamber means in constant fluid communication with said first fluid port means, second fluid chamber means having chamber wall means including said internal wall surface means of said rotary valve means, second passage means in said enclosure means connecting said second fluid chamber means in constant fluid communication with said second fluid port means, said rotary valve means comprising a valve body having first and second body portion means, said first body portion means of said rotary valve means separating fluid in said first fluid chamber means from said rotary valve face, said first body portion means of said rotary valve means having a wall surface constituting a portion of said external wall surface means of said rotary valve means, a first series of commutating fluid connection means interconnecting said wall surface of said first body portion means and said rotary valve face, said first series respectively terminating in said rotary valve face and constituting a first series of terminal commutating fluid connection means, said second body portion means of said rotary valve means separating fluid in said second fluid chamber means from said rotary valve face, said second body portion means having a wall surface constituting a portion of said internal wall surface means of said rotary valve means, a second series of commutating fluid connection means interconnecting said wall surface of said second body portion means and said rotary valve face, said second series respectively terminating in said rotary valve face and constituting a second series of terminal commutating fluid connection means, said first and second series of said terminal commutating fluid connection means being circumferentially disposed relative to said fixed axis and commutatingly registering with said terminating fluid openings in said stationary valve face, said internal wall surface means of said rotary valve means comprising an imperforate wall and thereby blanking fluid from flowing through said rotary valve body, and actuating means driven by said rotor element for rotating said rotary valve means relative to said stationary valve means.

References Cited

UNITED STATES PATENTS

| | | | |
|---|---|---|---|
| 472,126 | 4/1892 | Johnson | 64—31 X |
| 541,382 | 6/1895 | Nachtigal | 74—86 X |
| 1,916,391 | 7/1933 | Shamberger | 64—31 X |
| 2,335,170 | 11/1943 | Cerisano | 64—31 |
| 2,756,573 | 7/1956 | Colby | 64—31 |
| 3,087,436 | 4/1963 | Dettlof | 103—130 |
| 3,272,142 | 9/1966 | Easton | 103—130 |
| 3,289,542 | 12/1966 | Fikse | 91—56 |

MARTIN P. SCHWADRON, *Primary Examiner.*

G. N. BAUM, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,405,603                                                            October 15, 1968

George V. Woodling

It is certified that error appears in the above identified patent and that said Letters Patent are hereby corrected as shown below:

Column 12, line 44 and column 15, line 55, "facing against", each occurrenc should read -- held in facing relation to --.

Signed and sealed this 17th day of March 1970.

(SEAL)
Attest:

Edward M. Fletcher, Jr.                                    WILLIAM E. SCHUYLER, JR.
Attesting Officer                                                    Commissioner of Patents